Jan. 13, 1925.

W. KABELITZ

FOLDING CAMERA

Filed Aug. 30, 1921

1,523,126

Inventor:
Wilhelm Kabelitz
by Leo J. Matthy
atty.

Patented Jan. 13, 1925.

1,523,126

UNITED STATES PATENT OFFICE.

WILHELM KABELITZ, OF FRIEDENAU, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

FOLDING CAMERA.

Application filed August 30, 1921. Serial No. 496,946.

(GRANTED UNDER THE PROVISIONS OF THE ACT OF MARCH 3, 1921, 41 STAT. L., 1313.)

*To all whom it may concern:*

Be it known that I, WILHELM KABELITZ, a citizen of the German Republic, and resident of Friedenau, near Berlin, Germany, have invented certain new and useful Improvements in and Relating to Folding Cameras, of which the following is a specification.

This invention relates to folding cameras and consists in a construction which is simple and cheap in manufacture and reliable in operation.

An embodiment of the new camera is illustrated on the accompanying drawing wherein—

Figure 1:
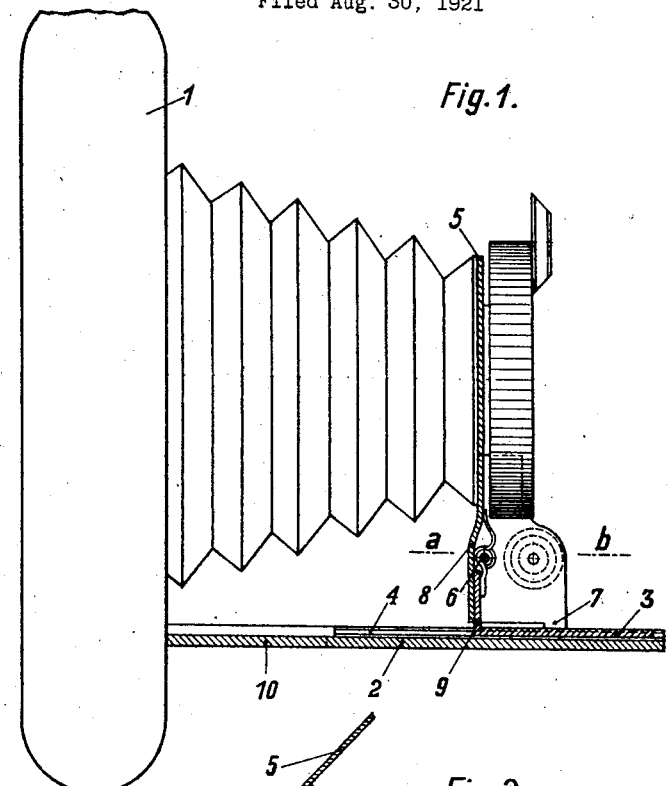
Fig. 1 shows a side elevation partly in section of the camera in operative condition, Fig. 2 a longitudinal section through the hinged cover with the objective carrier in a middle position which it assumes during closing of the cover.
Figure 2:
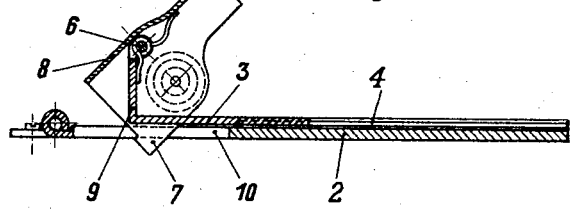
Figure 3:
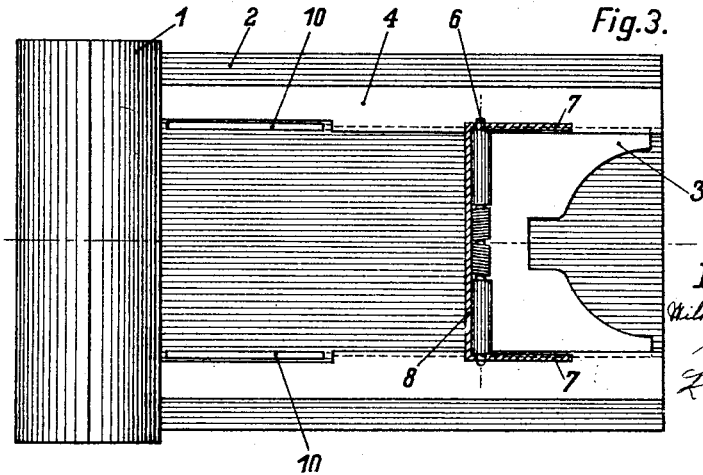
Fig. 3 is a plan view of the camera and a section on the line *a—b* of Fig. 1, the bellows being omitted.

The casing of the camera is designated 1, 2 is the hinged cover, 3 a slide adapted to be moved thereon guided by guide ways 4. 5 is the objective carrier and 6 a joint between objective carrier 5 and slide 3. The objective carrier 5 is provided with lateral stay members 7 fixed thereto adapted to contact with the slide rails 4 so as to prevent forward inclination of objective carrier 5 in its forward or operative position. 8 is a stop member provided on the objective carrier 5 contacting with an upright part 9 of slide 5 so as to prevent backward inclination of objective carrier 5. 10 are slots at the rearward end of the hinged cover 2 lying in the path of movement of stays 7 so that same can pass through said slots when the slide is pushed back on the hinged cover thus allowing closing of the cover while retaining safe guiding of the slide 3 between guide ways 4, the objective carrier 5 being turned about its pivot 6 as shown in Fig. 2. When the hinged cover is completely closed the objective carrier is turned about hinge 6 to such extent that stays 7 do no more project over the outer surface of the hinged cover.

What I claim is:

1. A folding camera comprising in combination a casing, a cover hinged to said casing, guide ways on said cover, a slide guided by said guide ways, an objective carrier, pivotably connected to said slide, means comprising stay members in fixed connection with said objective carrier guided on said cover, so as to lock the objective carrier against forward tilting, the guides for the stays being limited to the forward portion of the cover only.

2. A folding camera comprising in combination a casing, a cover hinged to said casing, guide ways on said cover, a slide guided by said guide ways, an objective carrier, pivotably connected to said slide, means comprising stay members in fixed connection with said objective carrier guided on said cover, so as to lock the objective carrier against forward tilting, the guides for the stays being limited to the forward portion of the cover only, the rearward portion of the cover being provided with slots in line with the path of movement of the stays and allowing the entrance of the stays and consequently forward tilting of the objective carrier in its rearward position on the cover preparatory to closing the camera.

3. Folding camera comprising in combination a casing, a cover hinged to said casing, guide ways on said cover, a slide guided by said guide ways, an objective carrier, pivotably connected to said slide, means adapted to lock the pivotable objective carrier against rearward tilting on said cover, means comprising stay members in fixed connection with said objective carrier guided on said cover so as to lock the objective carrier also against forward tilting, the guides for the stays being limited to the forward portion of the cover only, the rearward portion of the cover adjacent its hinged end being provided with slots in line with the path of movement of the stays allowing the entrance of same and consequently forward tilting of the objective carrier when in rearward position on the cover preparatory to closing the camera.

In testimony whereof I have signed this specification in the presence of two subscribing witnesses.

WILHELM KABELITZ.

Witnesses:
EBEHARD FACHLING,
FRITZ SCHMIDT.